United States Patent
Vanstone et al.

(10) Patent No.: US 6,487,660 B1
(45) Date of Patent: Nov. 26, 2002

(54) TWO WAY AUTHENTICATION PROTOCOL

(75) Inventors: Scott Alexander Vanstone, Campbellville (CA); Donald B. Johnson, Fairfax, VA (US); Robert J. Lambert, Cambridge (CA); Ashok Vadekar, Rockwood (CA)

(73) Assignee: Certicon Corp., Mississauga (CA)

( * ) Notice: Subject to any disclaimer, the term of this patent is extended or adjusted under 35 U.S.C. 154(b) by 0 days.

(21) Appl. No.: 09/432,166

(22) Filed: Nov. 2, 1999

Related U.S. Application Data

(63) Continuation of application No. PCT/CA98/00418, filed on May 4, 1998.

(30) Foreign Application Priority Data

May 2, 1997 (GB) .............................................. 9709135

(51) Int. Cl.$^7$ ................................................ G06F 1/24
(52) U.S. Cl. ...................... 713/168; 713/155; 380/229; 380/232
(58) Field of Search ................................ 380/232, 229, 380/247, 28; 713/155, 168

(56) References Cited

U.S. PATENT DOCUMENTS

| | | | | |
|---|---|---|---|---|
| 4,949,380 A | * | 8/1990 | Chaum ......................... | 380/30 |
| 5,272,755 A | | 12/1993 | Myiaji et al. .................. | 380/30 |
| 5,504,817 A | * | 4/1996 | Shamir ......................... | 380/30 |
| 6,011,848 A | * | 1/2000 | Kanda et al. .................. | 380/25 |

FOREIGN PATENT DOCUMENTS

| | | |
|---|---|---|
| EP | 0225010 | 6/1987 |
| EP | 0440800 | 8/1991 |
| EP | 0461983 | 12/1991 |
| WO | 8911706 | 11/1989 |
| WO | 9320538 | 10/1993 |

OTHER PUBLICATIONS

Menezes et al, "Handbook of Applied Cryptography", Protocol 12.5.2(iii), pp 427–429, CRC Press, Oct. 17, 1996.*
Schnorr, C.P.: "Efficient signature generation by smart cards" Journal of Cryptology, Vo. 4, No. 3, Jan. 1, 1991, pp. 161–174, XP000574352.
Bellare, M. et al.: "Keying hash functions for message authentication" Advances in Cryptology—Crypto 1996, 16th Annual International Cryptology Conference Santa Barbara, Aug. 18–22, 1996. Proceedings, No. Conf. 16, Aug. 18, 1996, pp. 1–15, XP000626584 Koblitz N (Ed.).
Kenji, Koyama et al.: "Elliptic curve cryptosystems and their applications" IEICE Transactions on Information and Systems vol. E75–D, No. 1, Jan. 1, 1992, pp. 50–57, XP000301174.

* cited by examiner

Primary Examiner—Thomas R. Peeso
(74) Attorney, Agent, or Firm—Orange & Chari; John R. S. Orange

(57) ABSTRACT

A method of authenticating a pair of correspondents C,S to permit the exchange of information therebetween, each of the correspondents having a respective private key, e, d and a public key, $Q_u$, and $Q_s$ derived from a generator element of a group and a respective ones of the private keys e,d, the method comprising the steps of: a first of the correspondents C generating a session value x; the first correspondent generating a private value t, a public value derived from the private value t and the generator and a shared secret value derived from the private value t and the public key $Q_s$ of the second correspondent; the second correspondent generating a challenge value y and transmitting the challenge value y to the first correspondent; the first correspondent in response thereto computing a value h by applying a function H to the challenge value y, the session value x, the public value an of the first correspondent; the first correspondent signing the value h utilizing the private key e; the first correspondent transmitting to the second correspondent the signature including the session value x, and the private value t; and the second correspondent verifying the signature utilizing the public key $Q_u$ of the first correspondent and whereby verification of the signature authenticates the first correspondent to the second correspondent.

17 Claims, 11 Drawing Sheets

| P-ATM/SAM | KDS | Service Server |
|---|---|---|
| $ID_u, d_u, Q_u, Q_k$ | Initial configuration $ID_k, d_k, Q_k$ | $d_s, Q_s$ |
| | Online P-ATM to server binding | |
| generate $x, tP, tQ_k$ | connect → | |
| | ← query ID $(y)$ | generate $y$ |
| $h = SHA(x\|y\|tP\|ID_u)$ | | |
| $s = S_c(h)$ | | |
| $K = SHA(tQ_k\|x\|y)$ | | |
| | $(ID_u, x, tP, s) \rightarrow$ | lookup $Q_u$ using $ID_u$ |
| | | $h = SHA(x\|y\|tP\|ID_u)$ |
| | | verify $h, S_c(h)$ with $Q_u$ |
| | | compute $d(tP) \equiv tQ_k$ |
| | | $K = SHA(d(tP)\|x\|y)$ |
| | | generate $M_1 = Q_s$ |
| | ← $(M_1, S_K(M_1))$ | $S_K(M_1) = DES_K^E(M_1)$ |
| verify | | |
| $S_K(M_1) \equiv DES_K^E(M_1)$ | | |
| program $Q_s = M_1$ | | |
| generate $M_2 = ACK$ | | |
| $S_K(M_2) = DES_K^E(M_2)$ | $(M_2, S_K(M_2)) \rightarrow$ | verify $S_K(M_2) \equiv DES_K^E(M_2)$ |
| | | update database |

FIGURE 3(a)

| KDS to server distribution | | |
|---|---|---|
| generate $x, tP, tQ_s$ | | |
| | connect $\rightarrow$ | |
| | $\leftarrow$ query ID $(y)$ | generate $y$ |
| $h = \text{SHA}(x\|y\|tP\|ID_k)$ | | |
| $s = S_e(h)$ | | |
| $K = \text{SHA}(tQ_k\|x\|y)$ | | |
| | $(ID_k, x, tP, s) \rightarrow$ | lookup $Q_k$ using $ID_k$ |
| | | $h = \text{SHA}(x\|y\|tP\|ID_k)$ |
| | | verify $h, S_e(h)$ with $Q_k$ |
| | | compute $d(tP) \equiv tQ_k$ |
| | | $K = \text{SHA}(d(tP)\|x\|y)$ |
| | | generate $M_1$ = Update query |
| verify $S_K(M_1) \equiv \text{DES}_K^E(M_1)$ | $\leftarrow (M_1, S_K(M_1))$ | $S_K(M_1) = \text{DES}_K^E(M_1)$ |
| generate $M_2 = (ID_u, Q_u)$ | | |
| $S_K(M_2) = \text{DES}_K^E(M_2)$ | | |
| | $(M_2, S_K(M_2)) \rightarrow$ | verify |
| | | $S_K(M_2) \equiv \text{DES}_K^E(M_2)$ |
| | | add $(ID_u, Q_u)$ to database |

Figure 3(b)

| P-ATM to server access | | |
|---|---|---|
| generate $x, tP, tQ_s$ | | |
| | connect $\rightarrow$ | |
| | $\leftarrow$ query ID $(y)$ | generate $y$ |
| $h = \text{SHA}(x\|y\|tP\|ID_u)$ | | |
| $s = S_e(h)$ | | |
| $K = \text{SHA}(tQ_s\|x\|y)$ | | |
| | $(ID_u, x, tP, s) \rightarrow$ | lookup $Q_u$ using $ID_u$ |
| | | $h = \text{SHA}(x\|y\|tP\|ID_u)$ |
| | | verify $h, S_e(h)$ with $Q_u$ |
| | | compute $d(tP) \equiv tQ_s$ |
| | | $K = \text{SHA}(d(tP)\|x\|y)$ |
| verify $S_K(M_1) \equiv \text{DES}_K^E(M_1)$ | $\leftarrow (M_1, S_K(M_1))$ | $S_K(M_1) = \text{DES}_K^E(M_1)$ |
| process $M_1$, generate $M_2$ | | |
| compute $S_K(M_2) = \text{DES}_K^E(M_2)$ | | |
| | $(M_2, S_K(M_2)) \rightarrow$ | verify $S_K(M_2) \equiv \text{DES}_K^E(M_2)$ |

Figure 3(c)

| P-ATM | KDS | Service Server |
|---|---|---|
| | Initial configuration | |
| $ID_u$ | $ID_k, d_k, Q_s$ | $d_s, Q_s$ |
| | Online P-ATM to server binding | |
| generate $x, tP, tQ_s$ | | |
| connect → | | |
| | ← query ID ($y$) | |
| ($ID_u, x, tP$) → | | |
| | generate $y$ | |
| | lookup $ID_u$ | |
| | compute $d(tP) \equiv tQ_k$ | |
| $K = SHA(x\|y\|tQ_s\|ID_u)$ | $K = SHA(x\|y\|d(tP)\|ID_u)$ | |
| | generate $M_1 = Q_s$ | |
| | $S_K(M_1) = DES^E_K(M_1)$ | |
| | ← ($M_1, S_K(M_1)$) | |
| verify | | |
| $S_K(M_1) \equiv DES^E_K(M_1)$ | | |
| program $Q_s = M_1$ ; | | |
| generate $M_2 = ACK$ | | |
| $S_K(M_2) = DES^E_K(M_2)$ | | |
| ($M_2, S_K(M_2)$) → | verify $S_K(M_2) \equiv DES^E_K(M_2)$ | |
| | update database | |
| | KDS to server distribution | |
| | generate $x, tP, tQ_s$ | |
| | connect → | |
| | ← query ID ($y$) | |
| | ($ID_k, x, tP$) → | |
| | | generate $y$ |
| | | lookup $ID_k$ |
| | | compute $d(tP) \equiv tQ_k$ |
| | $K = SHA(x\|y\|tQ_k\|ID_k)$ | $K = SHA(x\|y\|d(tP)\|ID_k)$ |
| | | generate $M_1 = $ Update query |
| | | $S_K(M_1) = DES^E_K(M_1)$ |
| | | ← ($M_1, S_K(M_1)$) |
| | verify $S_K(M_1) \equiv DES^E_K(M_1)$ | |
| | generate $M_2 = (ID_u, Q_u)$ | |
| | $S_K(M_2) = DES^E_K(M_2)$ | |
| | ($M_2, S_K(M_2)$) → | verify |
| | | $S_K(M_2) \equiv DES^E_K(M_2)$ |
| | | add ($ID_u, Q_u$) to database |
| | P-ATM to server access | |
| generate $x, tP, tQ_s$ | | |
| connect → | | |
| | | ← query ID ($y$) |
| ($ID_u, x, tP$) → | | |
| | | generate $y$ |
| | | lookup $ID_u$ |
| | | compute $d(tP) \equiv tQ_s$ |
| $K = SHA(x\|y\|tQ_s\|ID_u)$ | | $K = SHA(x\|y\|d(tP)\|ID_u)$ |
| | | $S_K(M_1) = DES^E_K(M_1)$ |
| | | ← ($M_1, S_K(M_1)$) |
| verify $S_K(M_1) \equiv DES^E_K(M_1)$ | | |
| process $M_1$, generate $M_2$ | | |
| compute $S_K(M_2) = DES^E_K(M_2)$ | | |
| ($M_2, S_K(M_2)$) → | | verify $S_K(M_2) \equiv DES^E_K(M_2)$ |

Figure 6:

| P-ATM | Service Server | KDS |
|---|---|---|
| | Initial configuration | |
| | $d_s, Q_s$ | $ID_u, Q_s, K_v$ |
| $ID_u$ | | |
| $SAK = TDES^E_{K_V}(ID_u)$ | | |
| | Registration/Binding | |
| Register | | Bind $ID_u$ to $Q_s$ |
| | | $SAK = TDES^E_{K_V}(ID_u)$ |
| | | $ESK = DES^E_{SAK}(ID_u, Q_s)$ |
| | $\leftarrow M$ | $M = (ID_u, ESK)$ |
| | Update database with $ID_u, ESK$ | |
| | First connection | |
| | connect $\rightarrow$ | |
| | $\leftarrow$ query ID (y) | generate y |
| | $(ID_u, x, tP) \rightarrow$ | lookup $ID_u$ |
| | $\leftarrow ESK$ | |
| Decrypt | | |
| $(ID, Q_s) = DES^D_{SAK}(ESK)$ | | |
| Verify $ID \equiv ID_u$ | | |
| Program $Q_s$ | | |

Figure 7

TWO WAY AUTHENTICATION PROTOCOL

This application is a continuation of International Application No. PCT/CA98/00418, filed May 4, 1998, the content of which is incorporated herein by reference.

This invention relates to a protocol for verifying parties in a transaction and, in particular, cryptographic protocols for providing secure personal ATM transactions between an electronic device and a server and in which the protocols are based on a public key algorithm.

BACKGROUND OF THE INVENTION

With advent of electronic commerce, the use of cash in financial transactions in becoming less popular, in favour of electronic wallets. Typically, a financial institution will issue its customers with a personal ATM device (P-ATM) and an electronic cash card. The user then uses the electronic cash card, which stores a cash amount thereon, in various financial transactions. The cash card communicates with the financial institution's central server via the personal ATM. Because there is less control exercised by a financial institution on a P-ATM than a regular ATM installed, for example, at a bank site, it is necessary for the P-ATMs to be authenticated both by the issuing financial institution as well as by the cash card user in addition to the usual verification of the cash card used by the institution and sometimes vice versa.

In order to simplify the manufacturing process for personal ATMs, the mapping of a P-ATM's cryptographic parameters to a server is unknown until the customer purchases the P-ATM device. To perform P-ATM to server binding, it is necessary to issue the appropriate server public key to the P-ATM and to issue the P-ATM public key and ID to the appropriate server. Both of these actions must be done securely. The difficulty in the authentication presented by this type of application is that the cash card must trust the server and vice versa. Thus, it is necessary that the server then verify the P-ATM and vice versa. Once the server and the P-ATM trust each other, the user can then use the cash card with the ATM with relative confidence. Furthermore, these verifications must be performed relatively quickly. Thus, there is a need for a verification and authentication protocol that meets the needs of this type of transaction.

SUMMARY OF THE INVENTION

This invention seeks to provide a verification and authentication protocol that enables at least one party in at least a three party transaction to be authenticated by the remaining parties.

Furthermore this invention seeks to provide an authentication protocol in a cash-card, personal ATM and server transaction.

This invention also seeks to provide a key distribution method for personal ATM's and the like.

In accordance with an aspect of the invention there is provided a method of authenticating a pair of correspondents C,S to permit exchange of information therebetween, each of said correspondents C,S having a respective private key e,d and a public key $Q_u$ and $Q_s$ derived from a generator P and a respective ones of said private keys e,d, a list of said correspondents C having a unique identification information $ID_u$ stored therein, said a second of said correspondent a including a memory for storing public keys of one or more of said first correspondents, said method comprising steps of:

a) said second of said correspondents generating a random value y upon initiation of a transaction between said correspondents;

b) said second correspondent S forwarding to said first correspondent C said value y;

c) said first correspondent C generating a first random number x and computing a public session key tP from a private key t;

d) said first correspondent C generating a message H by combining said first random number x, said value y, said public session key tP and said unique identification information $ID_u$ and computing a signature $S_e$ of said message H;

e) said first correspondent C transmitting said signature $S_e$, said public session key tP, said value x and said identification $ID_u$ to said second correspondent;

f) said second correspondent upon receipt of said message from said previous step (Q) retrieving said public key $Q_u$ of said first correspondent from said memory using said received identification information $ID_u$;

g) said second correspondent verifying said received signature using said recovered public key $Q_u$ and verifying said message H and computing a shared secret key d(tP), whereby both said correspondents may calculate a shared secret key k by combining the computed secret $tQ_s=d(tP)$ with said first random number x and said random value y, said key K being utilized in subsequent transactions between said correspondents for a duration of said session.

Also, this aspect of the invention provides for apparatus for carrying out the method. Such an apparatus can comprise any computational apparatus such as a suitably programmed computer.

BRIEF DESCRIPTION OF THE DRAWINGS

These and other features of the present invention will become more apparent from the following description of preferred embodiments of the invention, which are described by way of example, only, with reference to the accompanying drawings in which like elements have been assigned like numbers and wherein:

FIGS. 3(a), (b) and (c) are schematic diagrams of a two phase public key distribution system;

FIG. 6 is a further embodiment of a two phase public key distribution system; and FIG. 7 is a further embodiment of a single phase symmetric key distribution system.

DETAILED DESCRIPTION OF A PREFERRED EMBODIMENT

Figure 1:
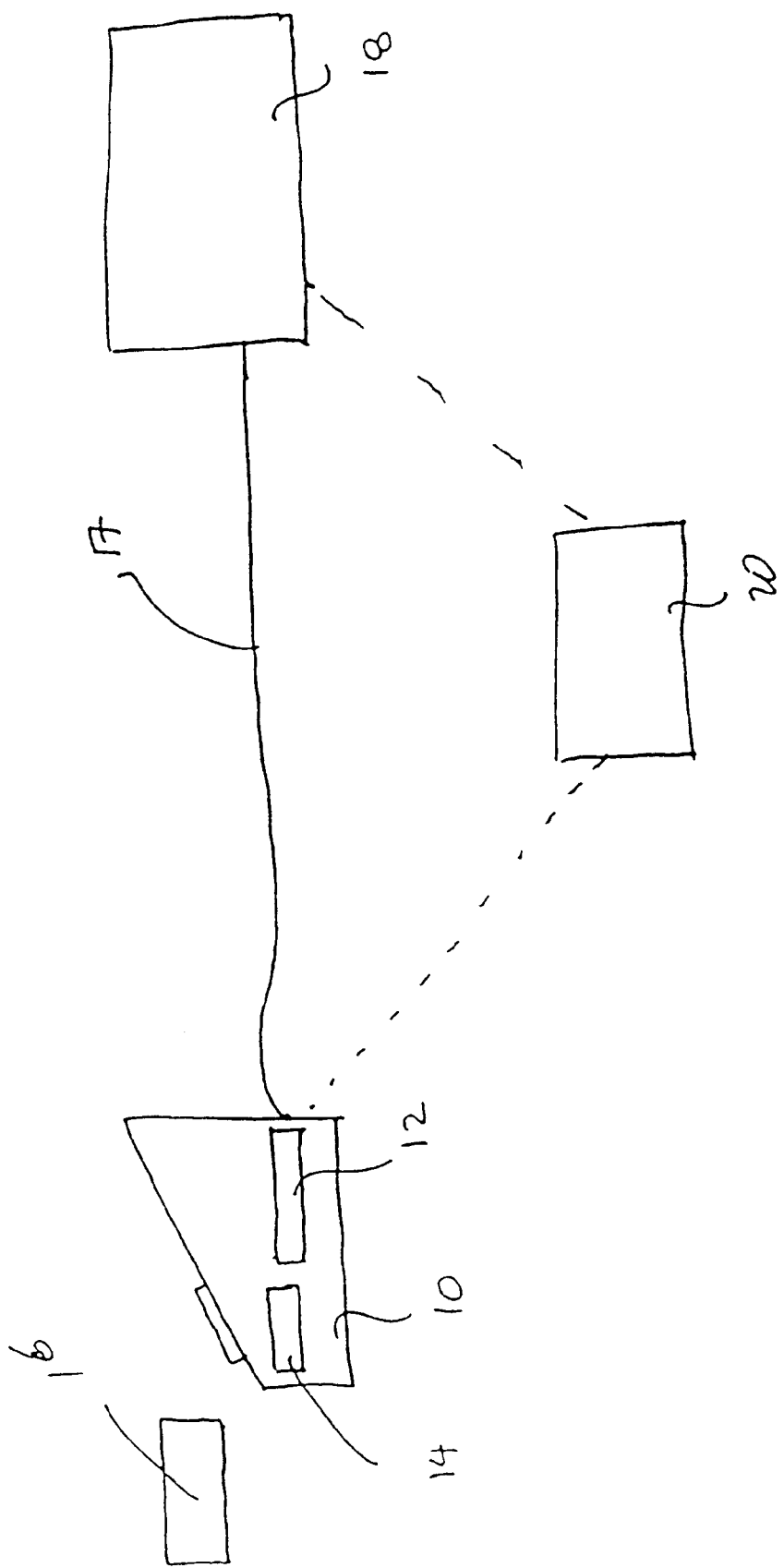
FIG. 1 is a schematic diagram of P-ATM server configuration.

Referring to FIG. 1, a personal ATM (P-ATM) 10 has sign only module (SAM) chip 12, such as a SC27 or SC46, embedded therein. The P-ATM also includes an 8058 8-bit processor chip 14 which is only capable of performing simple calculations due to its low processing power. The SAM module generally has elliptic curve (EC) sign-only capabilities and is generally available in "smart-cards" and the like. The P-ATM 10 is connected via a suitable communication channel 17 to a service server 18. A cash card 16 may be used to access services provided by the server 18 via the P-ATM 10.

Message exchange between the P-ATM 10 and the server takes place using public key encryption. For the sake of clarity, the following terms which are used in the following description, are defined:

P—A generator point on an elliptic curve.

$ID_u$—A string that uniquely identifies the P-ATM 10, this string is stored within the 8058 firmware.

e, $Q_u$—A private (signature) and public keys of the SAM embedded within a P-ATM device. The public key $Q_u$ is obtained from the private key e.

d, $Q_s$—Private and public keys of the server 18.

x—A session random value generated by a P-ATM device.

y—A session random value generated by the server 18.

M—A plaintext message of arbitrary content in either direction between the P-ATM and server.

SHA(M)—The hash of a message M using SHA-1.

$DES_K^E(M)$—The ciphertext generated by encrypting plaintext M with DES using a key K.

$DES_K^D(E)$—The plaintext generated by decrypting ciphertext E with DES using a key K.

$S_e(M)$—A signature generated by signing message M with private key e.

t—A Diffie-Hellman private value generated by the P-ATM used to generate a shared secret $tQ_s$. The value of t may be precomputed and/or reused over multiple sessions.

Figure 2A:
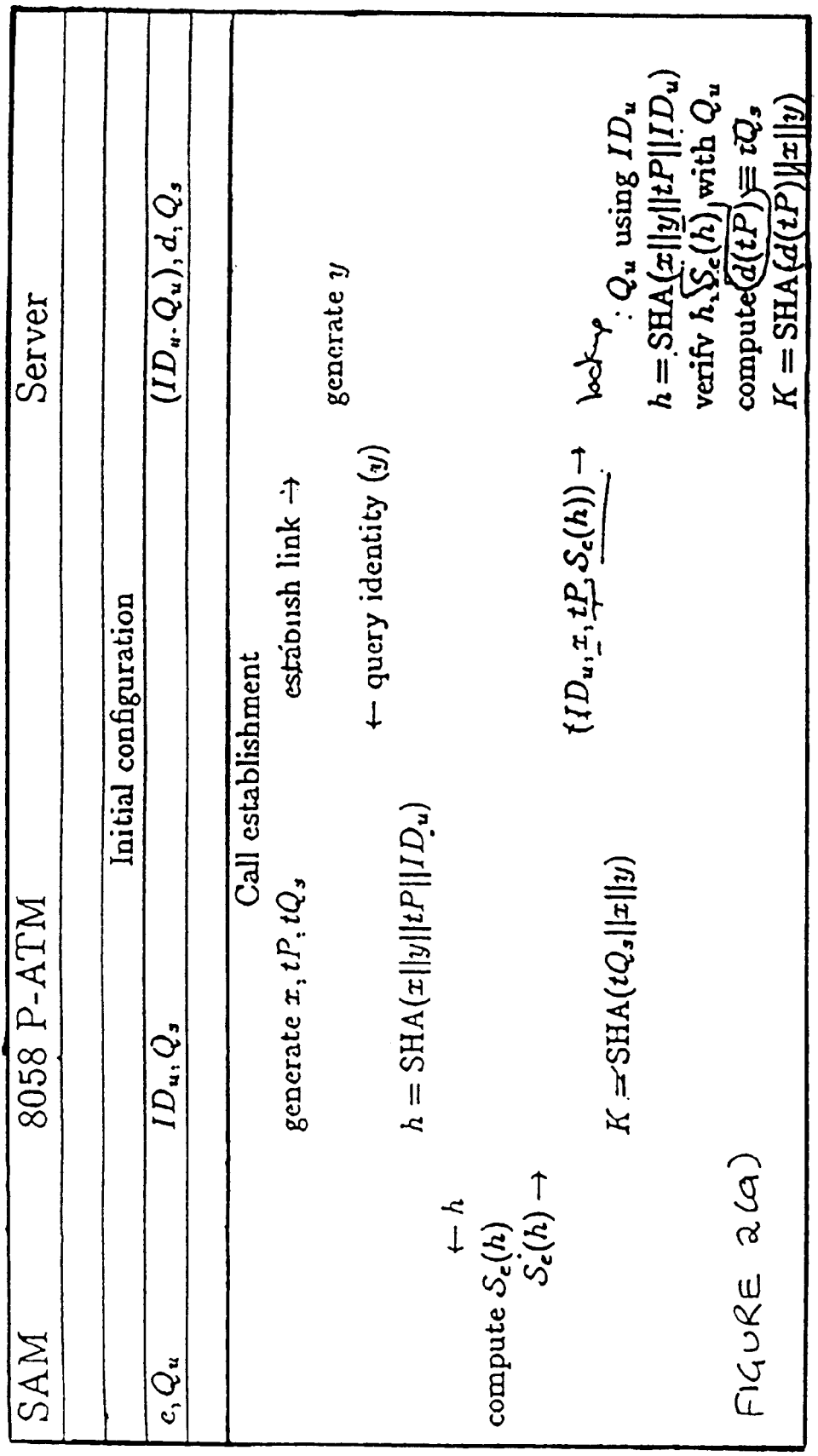
FIGS. 2(a), (b), (c) and (d) are schematic diagrams of an authentication protocol between a server and a personal ATM.

Referring now to FIG. 2(a), it is assumed that the SAM, the P-ATM and the server have already been initialized with the appropriate parameters. This will be discussed later. A session is established by the P-ATM initiating a call to the server on the request of a user. For each session, the P-ATM generates a random session unique value x and computes tP (the Diffie-Hellman shared secret) and $tQ_s$. The value t is the Diffie-Hellman private value used to generate the eventual shared secret $tQ_s$. The server, once it receives a call request from the P-ATM, will generate a random session value y and queries the identity of the P-ATM.

Generally, when the P-ATM establishes a call to the server, the server will generate a "who-are-you?" challenge to the P-ATM. The P-ATM's response to the server's "who-are-you?" challenge will include the following information: its serial number and/or equivalent identification string ($ID_u$) (this will be used for public key lookup at the server); the session unique number (x) (this must be a statistically unique number but not necessarily non-deterministic); the Diffie-Hellman public value (tP); and a signature $S_e(h)$ of the hash h=SHA(y∥x∥tP∥$ID_u$) signed by the private key e of the SAM. The P-ATM will thus send ($ID_u$, x, tP, $S_e(h)$) to the server. The SHA is generally an SHA-1 hash function.

At whatever point tP is computed Oust prior to the call, several sessions previous, or as a one time computation), it is also necessary to compute $tQ_s$.

At the server, $ID_u$ will be used to look up $Q_u$ from a database of stored public keys of literally thousands of P-ATMs. The value x may be verified to be unique if possible (for example, if x is a transaction number, make sure it is larger than the last transaction number). The values x, tP, and ID will be used to reconstruct the hashed message h=SHA(y∥x∥tP∥$ID_u$). The hash h will then be used to verify the signature using the public key $Q_u$ recovered from the database. Assuming all is successful, the server now knows that it is communicating with a legitimate P-ATM.

The server must now construct the Diffie-Hellman shared secret $tQ_s$. This is done with its private key d to compute:

$$tQ_s = d(tP).$$

From the shared secret d(tP) and both the server and P-ATM session-unique values y and x, respectively, a session key k is derived from a hash of (d(tP)∥x∥y∥ usage code), were the usage code may be a string specifying "MAC" or "ENC," or if only one, then it is set to null. The user of the P-ATM would decide whether to use "MAC" or "ENC," e.g. for transactions over $1000—use "ENC" or use "MAC," otherwise:

$$K=SHA(d(tP)\|x\|y\text{"MAC"}) \text{ or } \|\text{"ENC"}.$$

Set up by a user profile for example stored in the cash card when it is issued by the institution.

Figure 2B:
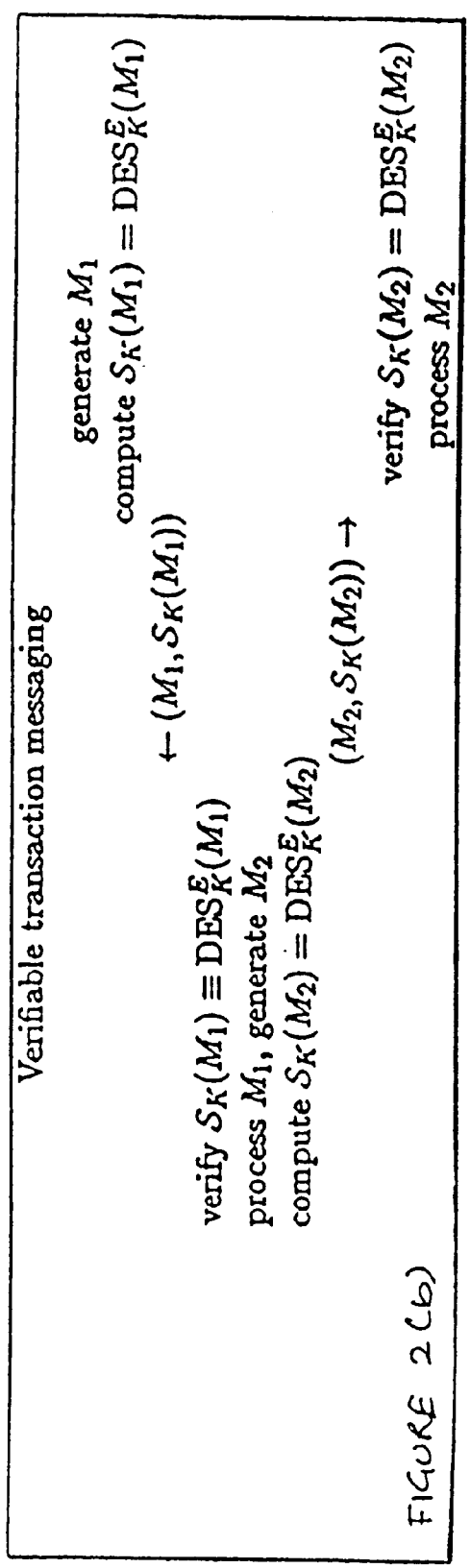
Figure 2C:
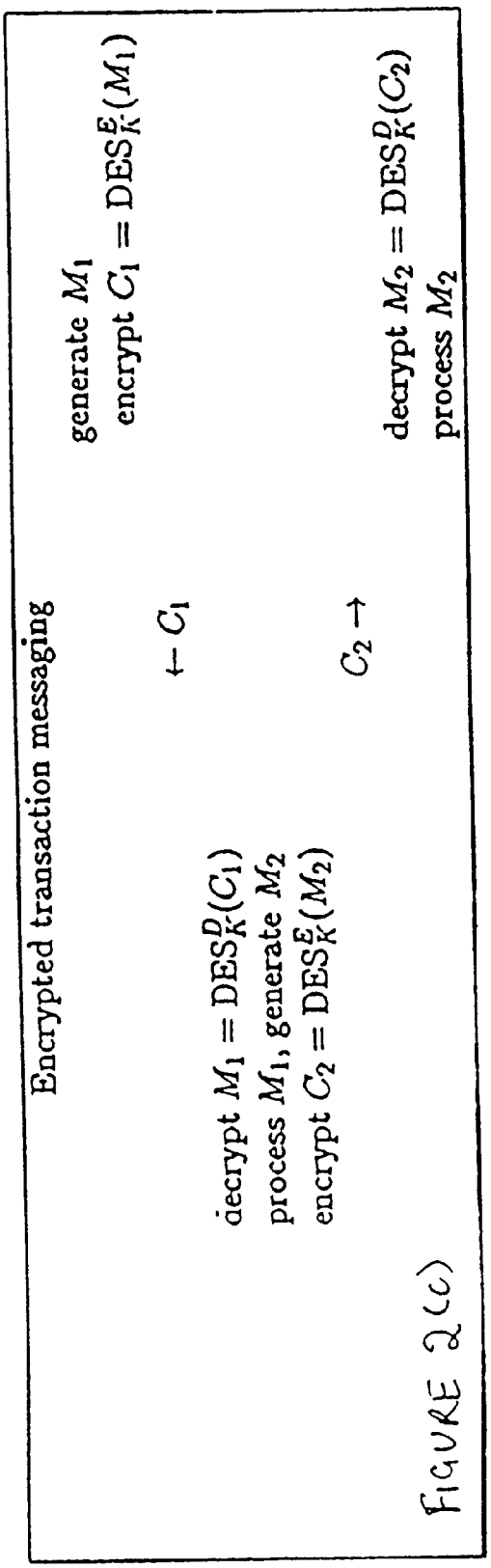
Figure 2D:
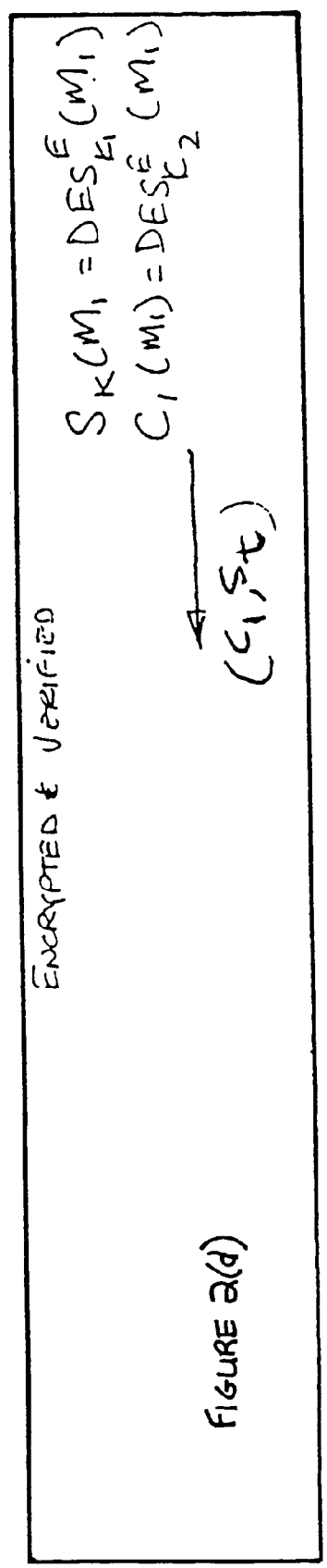

Transaction messages in either direction can now be made verifiable by appending a data encryption standard message authentication code (DES MAC) using the computed session key $K_{MAC}$ as shown in FIG. 2(b). Alternatively as shown in FIG. 2(c), messages can be made private by encrypting them with the key $K_{ENC}$ instead of MACing. If only authentication s required, the message recipient must recompute the MAC from the message and accept it only if the MACs agree. If encryption is desired, the plaintext message must be decrypted from the ciphertext message received. If both encryption and verification is required, then both encryption and MACing may be employed as shown in FIG. 2(d). With the above protocol, it may be seen that service storage, computation and speed constraints of the P-ATM are overcome since it performs relatively simple operations. For example, the computation of a hash is relatively easy, whereas the dedicated SAM performs the signature function. Similarly, the verification of the DES MAC is relatively easy for the P-ATM to perform. Thus, security is achieved by the P-ATM and server computing and using a shared secret that ensures the accuracy of each session.

Turning now to FIG. 3, as outlined earlier, in order to simplify the manufacturing process for P-ATMs, the mapping of P-ATMs to their servers is unknown until the customer purchases a device. It is anticipated that servers may service in the order of 100,000 P-ATMs. To perform P-ATM to server binding it is necessary to issue the appropriate server public key $Q_s$ to the P-ATM and to issue the P-ATM public key $Q_u$ and identity information $ID_u$ to the appropriate server. Both of these actions must be performed securely. This may be achieved by either a two phase method using public key cryptography which uses the previously defined secure protocol for P-ATM to server messaging or a one phase method using symmetric key cryptography.

A two phase public key distribution method is described with reference to FIG. 3. In this embodiment, a key distribution server (KDS) 20 exists, as shown in FIG. 1, which is used to bind P-ATMs 10 to their long-term servers 18. The SAM modules 12 within the P-ATMs 10 are pre-keyed with their private key e and public key $Q_u$ by the SAM manufacturer. The private key e can only be accessed from within the SAM by a signature functions. The public key $Q_u$ can be read by the P-ATM. The P-ATMs are preloaded with a public key $Q_u$ of the KDS at manufacture time. A connection must be established once from each P-ATM to the KDS in order to bind that P-ATM to the appropriate server. A connection must be established from the KDS to the server for each P-ATM being bound to that server.

Consider the initial state of the three distinct entities: KDS 20, P-ATM 10, and server 18. The KDS is installed and constructs its key pair ($d_k$, $Q_k$) prior to the manufacture of P-ATMs. Each P-ATM is manufactured with a SAM containing the key pair ($d_u$, $Q_u$), and with the KDS public key $Q_k$ embedded within its ROM. At some time in the future, the server 18 is installed and constructs its private, public key pair ($d_s$, $Q_s$). When this occurs, the KDS is informed of the server's public key ($Q_s$) and any localization information about the server (service type, geographic coverage, etc.).

Once a P-ATM is delivered to the customer it must be bound to a server before it can be used for its intended purpose. This is accomplished by first establishing a connection from the P-ATM 10 to the KDS 20. This can be done using the same communications mechanisms, protocols, and cryptography as a P-ATM-to-server connection. Once this connection is established, the P-ATM can issue its public key $Q_u$ to the KDS 20 and the KDS 20 can issue the appropriate server's public key $Q_u$ to the P-ATM 10. The appropriate server is determined by the application in which the P-ATM 10 is to be used. For example, it could be a function of where the P-ATM was purchased. Specification of the intended function for the P-ATM could be either inband or out of band.

Subsequent to this connection, the P-ATM now knows the server to which it will make a connection. The server must be informed of the new P-ATM that it must recognize. This can be done by the KDS making a secure connection with the server (again, using the same P-ATM-to-server protocol) as if it were a P-ATM. The new binding information may conveniently be stored in a database within the server and is then integrated into the server's world-view. This database update connection can occur either as a batch operation at the end of each week, in real-time on a per binding basis, or at some time in between these extremes.

In another embodiment, a single phase symmetric key distribution method is described with reference to FIG. 4. In this embodiment as with the previous embodiment, the SAM modules are pre-keyed by the SAM manufacturer. The private key $d_u$ can only be accessed by the signature function. The public key $Q_u$ can be read by the P-ATM. The P-ATMs are preloaded with a unique (DES) server authentication key (SAK) at manufacture time. This key will authenticate the server public key $Q_s$ the first time a connection is established to the P-ATM. A connection must be established to a server for each P-ATM being bound to that server. The KDS 20 maintains a solitary triple-DES key $K_v$ with which the P-ATM server authenticating keys (SAKs) are generated.

Consider the initial state of the P-ATM 10 and server 18. Each P-ATM is manufactured with a SAM containing the key pair ($d_u$, $Q_u$), and with a unique identifier $ID_u$. During manufacture, each P-ATM's identity defined by its unique identifier $ID_u$ and public key $Q_u(ID_u, Q_u)$ is encrypted under the triple-DES key $K_v$ to produce a SAK=T $DES_{K_v}^E(ID_u, Q_s)$. Each P-ATM obtains a unique SAK because the P-ATM identities are all distinct. At some time in the future, a client server is installed and constructs its key pair ($d_s$, $Q_s$). When this occurs, the KDS 20 is informed of the server's public key ($Q_s$) and any localization information about the server (service type, geographic coverage, etc.).

Once a P-ATM is delivered to the customer it must be bound to the server before it can be used for its intended purpose. Registering the P-ATM device with the KDS binds the P-ATM to the appropriate server. In order to notify the server of the newly legitimized P-ATM, that server is sent the P-ATM's identity $ID_u$ and public key $Q_u$. In order for the P-ATM to accept the server as legitimate the first time a connection is established, the P-ATM's identity and server's public key $Q_s$ are encrypted with the P-ATM's SAK (ESK= $DES_{S_{AK}}^E(ID_u, Q_s)$) and sent to the server as an update to its database. This transport can be easily used to protect server updates.

Figures 4A, 4B:
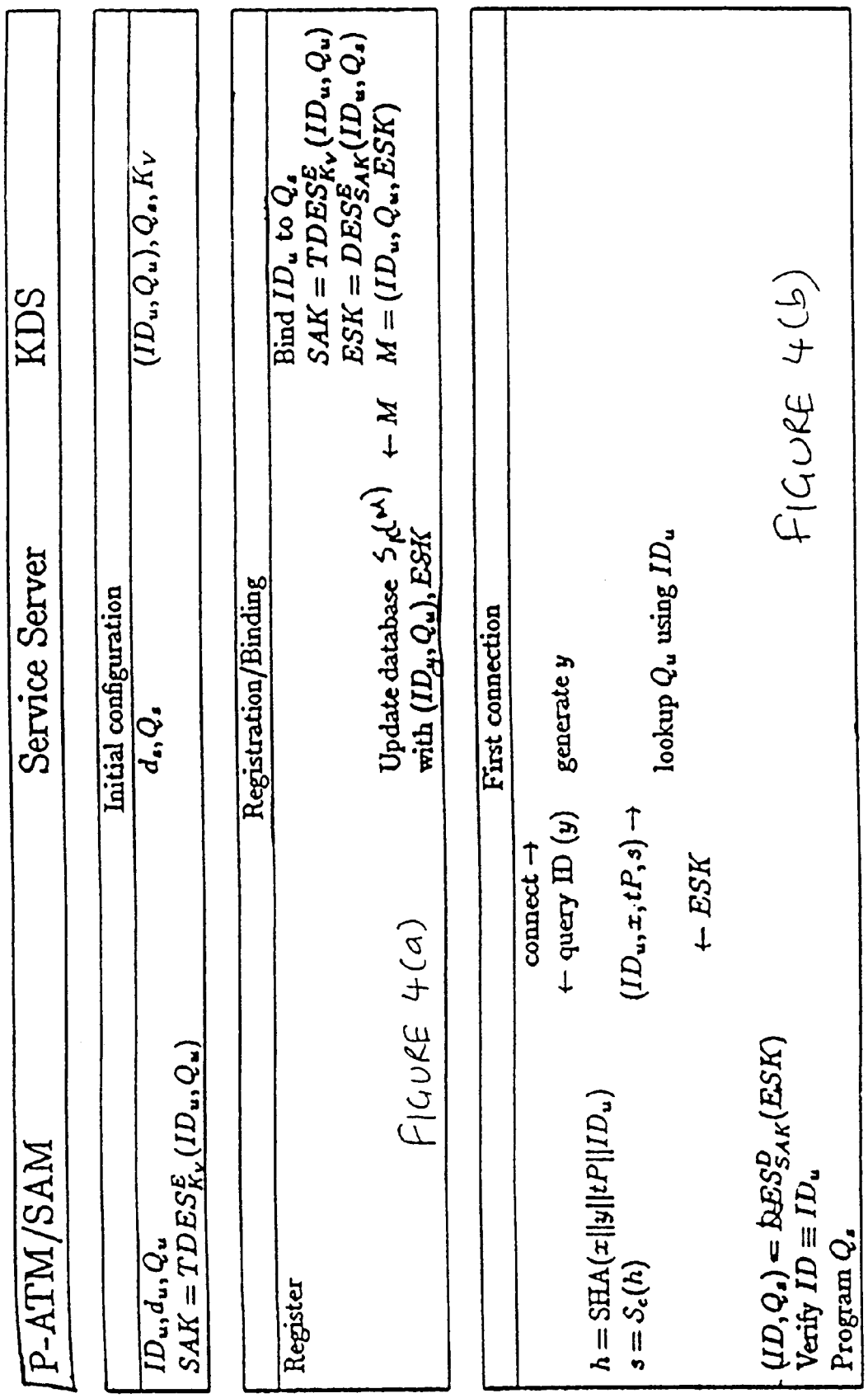
FIGS. 4(a) and (b) are schematic diagrams of a single phase symmetric key distribution system.

The server will issue the encrypted key to the P-ATM where it is verified using the SAK as shown in FIG. 4(b). The SAK need not be securely stored at manufacture time for this purpose; it is possible to reconstruct the SAK using the ID and public key of the P-ATM and the triple-DES key which only the KDS has.

Figures 5A, 5B:
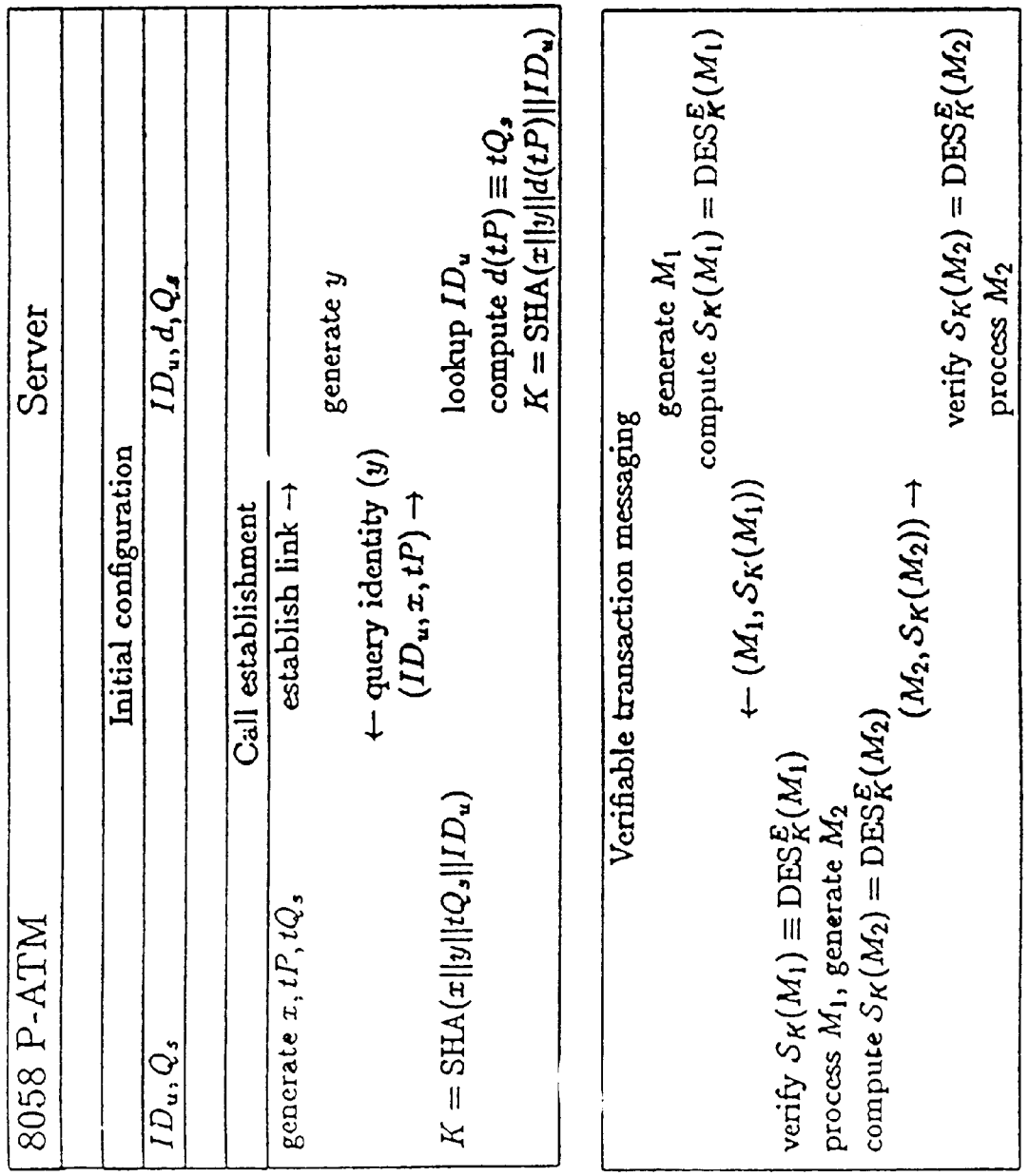
FIGS. 5(a), (b) and (c) are schematic diagrams showing a protocol for establishing a secure session without a sign only module.

In another embodiment, the P-ATM may not have a SAM module embedded within it. In this case, as shown in FIG. 5(a), the P-ATM's response to the server's "who-are-you?" challenge will include its identification string ($ID_u$) and its transaction-unique number (x) and the Diffie-Hellman public value (tP). In contrast to the embodiment shown in FIG. 2, where the response includes the signature component.

As previously shown, $ID_u$ will be checked in the database. If it exists, the server now knows that it is communicating with a legitimate P-ATM. The transaction number x may be verified unique if possible (for example, if x is a transaction number, make sure it is larger than the last transaction number). The Diffie-Hellman shared secret $tQ_s$ will be computed from the transmitted value tP using the server's private key d. From the shared secret and both the server and P-ATM session-unique values a session key is derived:

$$K=SHA(x\|y\|d(tP)\|ID_u\|\text{``MAC''}) \text{ or } \|\text{``ENC''} \text{ or both or null.}$$

This completes the secure call establishment as is more clearly seen with reference to FIG. 5(a).

Figure 5C:
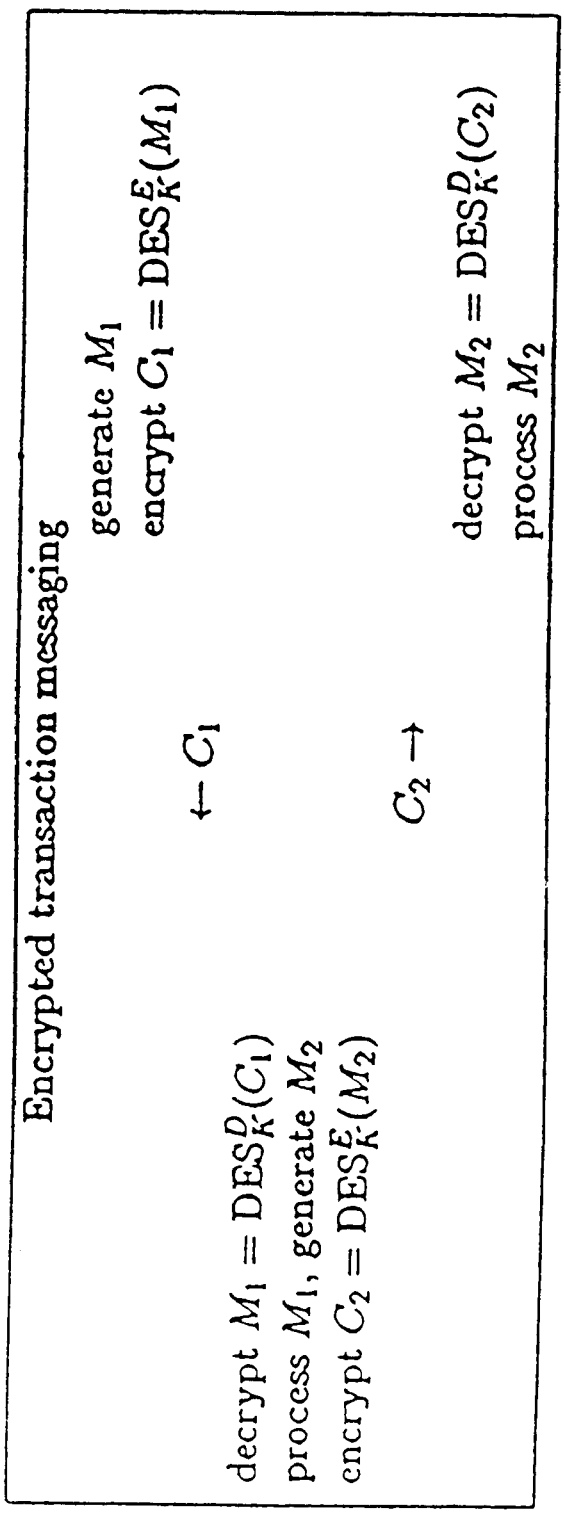

Once a secure call has been established between the P-ATM and the server, transaction messages in either direction can now be made verifiable by appending a DES MAC using the computed session key shown in FIG. 5(b) and 5(c). Alternatively, messages can be made private by encrypting them with that key instead of MACing them. If only authentication is required, the message recipient must recompute the MAC from the message and accept it only if the MACs agree. If encryption is desired, the plaintext message must be decrypted from the ciphertext message received or both.

In the case of P-ATMs not manufactured with SAM modules it is still necessary to perform P-ATM to server binding to issue the appropriate server public key to the P-ATM and to issue the P-ATM ID to the appropriate server. Both of these actions must be done securely. As with the SAM module P-ATM previously described, two methods of key distribution may be implemented. The two phase public key distribution method, as shown in FIG. 6, once again assumes that a key distribution server (KDS) exists which issues binding information to the appropriate server for each P-ATM. The P-ATMs are preloaded with a server authentication key (SAK) generated by the KDS at manufacture time. The KDS uses the same triple-DES key to generate unique SAKs for all P-ATMs.

Alternatively, a single phase symmetric key distribution method is illustrated in FIG. 7. The P-ATMs are preloaded with a unique (DES) server authentication key (SAK) at manufacture time. This key will authenticate the server public key the first time a connection is established. A connection must be established from the KDS to a server for each P-ATM being bound to that server. The KDS maintains a solitary triple-DES key with which the P-ATM server authenticating keys (SAKs) are generated. This key distribution then proceeds similarly to that described with reference to the embodiment shown in FIG. 4.

While the above protocols have been described with reference to specific embodiments thereof and in a specific use, various modifications thereof will occur to those skilled in the art without departing from the spirit of the invention. For example, other symmetric key schemes, instead of DES and triple DES, may be implemented, similarly equivalent hash functions, possibly derived from DES may be implemented instead of SHA1. The protocols provide secure generation and loading of keying material at both the time of manufacture of the P-ATM and the initial communication with its assigned server. They also provide mutual authentication of the P-ATM and server on a per session basis.

What is claimed is:

1. A method of authenticating a pair of correspondents C,S to permit the exchange of information therebetween, each of said correspondents having a respective private key, e, d and a public key, $Q_u$ and $Q_s$ derived from a generator element of a group and a respective ones of said private keys e,d said method comprising the steps of:
   i. a first of said correspondents C generating a session value x;
   ii. said first correspondent generating a private value t, a public value derived from said private value and said generator and a shared secret value derived from said private value t and said public key $Q_s$ of said second correspondent;
   iii. said second correspondent generating a challenge value y and transmitting said challenge value y to said first correspondent;
   iv. said first correspondent in response thereto computing a value h by applying a function H to said challenge value y, said session value x, said public value of said first correspondent;
   v. said first correspondent signing said value h utilizing said private key e;
   vi. said first correspondent transmitting to said second correspondent said signature including said session value x, and said private value t; and
   vii. said second correspondent verifying said signature utilizing said public key $Q_u$ of said first correspondent and whereby verification of said signature authenticates said first correspondent to said second correspondent.

2. A method as defined in claim 1, including said second correspondent computing said shared secret value by utilizing its private key d and said public value and said first and second correspondents computing a session key k derived from said shared secret, said session value x and said challenge value y.

3. A method as defined in claim 1, said signature forwarded by said first correspondent includes an identification IDu of said first correspondent.

4. A method as defined in claim 1, said first correspondent including a general purpose computer and a signature module for computing said signature.

5. A method as defined in claim 4, said private and public keys of said first correspondent being embedded within said signature module and said private key being accessible by a signature function.

6. A method as defined in claim 5, said identification $ID_u$ being stored within said general purpose processor.

7. A method as defined in claim 1, said public value being a Diffie-Hellman public value.

8. A method as defined in claim 1, said group being an elliptic curve group $E(F_a)$ and
   said generator element being a point P on said elliptic curve.

9. A method as defined in claim 1, said second correspondent utilizing said identification $ID_u$ for retrieving said public key $Q_u$ from a database.

10. A method as defined in claim 9, said session key k including a usage code value for specifying a transaction type in a given session.

11. A method as defined in claim 1, said function H being a hash function.

12. A method as defined in claim 1, including transmitting a verifiable message between said correspondents by appending thereto a data encryption standard authentication code using said computed session key.

13. A method as defined in claim 1, said group being an elliptic curve group $E(F_2^m)$ and said generator being a point P on said elliptic curve.

14. A method as defined in claim 1, said second correspondent being a key distribution server.

15. A method as defined in claim 1, said first correspondent being a terminal and second correspondent being a server.

16. A method of authenticating a pair of correspondents C,S to permit the exchange of information therebetween, each of said correspondents having a respective private key, e, d and a public key, $Q_u$ and $Q_s$ derived from a generator element of a group and a respective ones of said private keys e,d, said method comprising the steps of:
   i. a first of said correspondents C generating a session value x;
   ii. said first correspondent generating a private value t, a said generator and a shared secret value derived from said private value t and said public key $Q_s$ of said second correspondent;
   iii. said second correspondent generating a challenge value y and transmitting said challenge value y to said first correspondent;
   iv. said first correspondent in response thereto transmitting said challenge value y, said session value x, and said public value of said first correspondent; and
   said second correspondent verifying a corresponding stored identity to thereby verify said first correspondent.

17. A method of authenticating a pair of correspondents C,S to permit exchange of information therebetween, each of said correspondents C,S having a respective private key e,d and a public key $Q_u$ and $Q_s$ derived from a generator P and a respective ones of said private keys e,d, a second of said correspondents including a memory for storing public keys of one or more of said first correspondents, said memory including a list of said first correspondents having a unique identification information $ID_u$ stored therein, said method comprising the steps of:
   a) said second of said correspondents generating a random value y upon initiation of a transaction between said correspondents;
   b) said second correspondent S forwarding to said first correspondent C said value y;
   c) said first correspondent C generating a first random number x and computing a public session key tP from a private key t,
   d) said first correspondent C generating a message H by combining said first random number x, said value y, said public session key tP and said unique identification information $ID_u$, and computing a signature $S_e$ of said message H;

e) said first correspondent C transmitting said signature $S_e$, said public session key tP, said value x and said identification $ID_u$ to said second correspondent;

f) said second correspondent upon receipt of said message from said previous step (Q) retrieving said public key $Q_u$ of said first correspondent from said memory using said received identification information $ID_u$; and g) said second correspondent verifying said received signature using said recovered public key $Q_u$ and verifying said message H and computing a shared secret key d(tP), whereby both said correspondents may calculate a shared secret key k by combining the computed secret $tQ_s = d(tP)$ with said first random number x and said random value y, said key k being utilized in subsequent transactions between said correspondents for a duration of said session.

* * * * *

UNITED STATES PATENT AND TRADEMARK OFFICE
CERTIFICATE OF CORRECTION

PATENT NO. : 6,487,660 B1  Page 1 of 1
APPLICATION NO. : 09/432166
DATED : November 26, 2002
INVENTOR(S) : Alexander Scott Vanstone et al.

It is certified that error appears in the above-identified patent and that said Letters Patent is hereby corrected as shown below:

Title Page, item [73] Assignee should read: "Certicom Corp.".

On the title page, item (57), in the Abstract, line 4, "$Q_u$ and" should read "$Q_u$ and".

Claim 1, column 7, line 19, "e,d said" should read "e,d, said".

Claim 1, column 7, line 22, "value t,a" should read "value t, a".

Claim 1, column 7, line 23, "value and" should read "value t and".

Claim 1, column 7, line 39, "private value t" should read "public value".

Claim 3, column 7, line 51, "includes" should read "including".

Claim 3, column 7, line 52, "IDu" should read "$ID_u$".

Claim 8, column 7, line 65, "$E(F_a)$" should read "$E(F_g)$".

Claim 16, column 8, line 31, "t,a" should read "t and".

Claim 16, column 8, line 42, before "said second" insert --v--.

Claim 17, column 8, line 62, "key t," should read "key t;".

Signed and Sealed this

Seventeenth Day of August, 2010

David J. Kappos
*Director of the United States Patent and Trademark Office*